June 12, 1934.   K. MAERTENS ET AL   1,962,316
MOTOR CONTROL SYSTEM
Filed Feb. 5, 1932
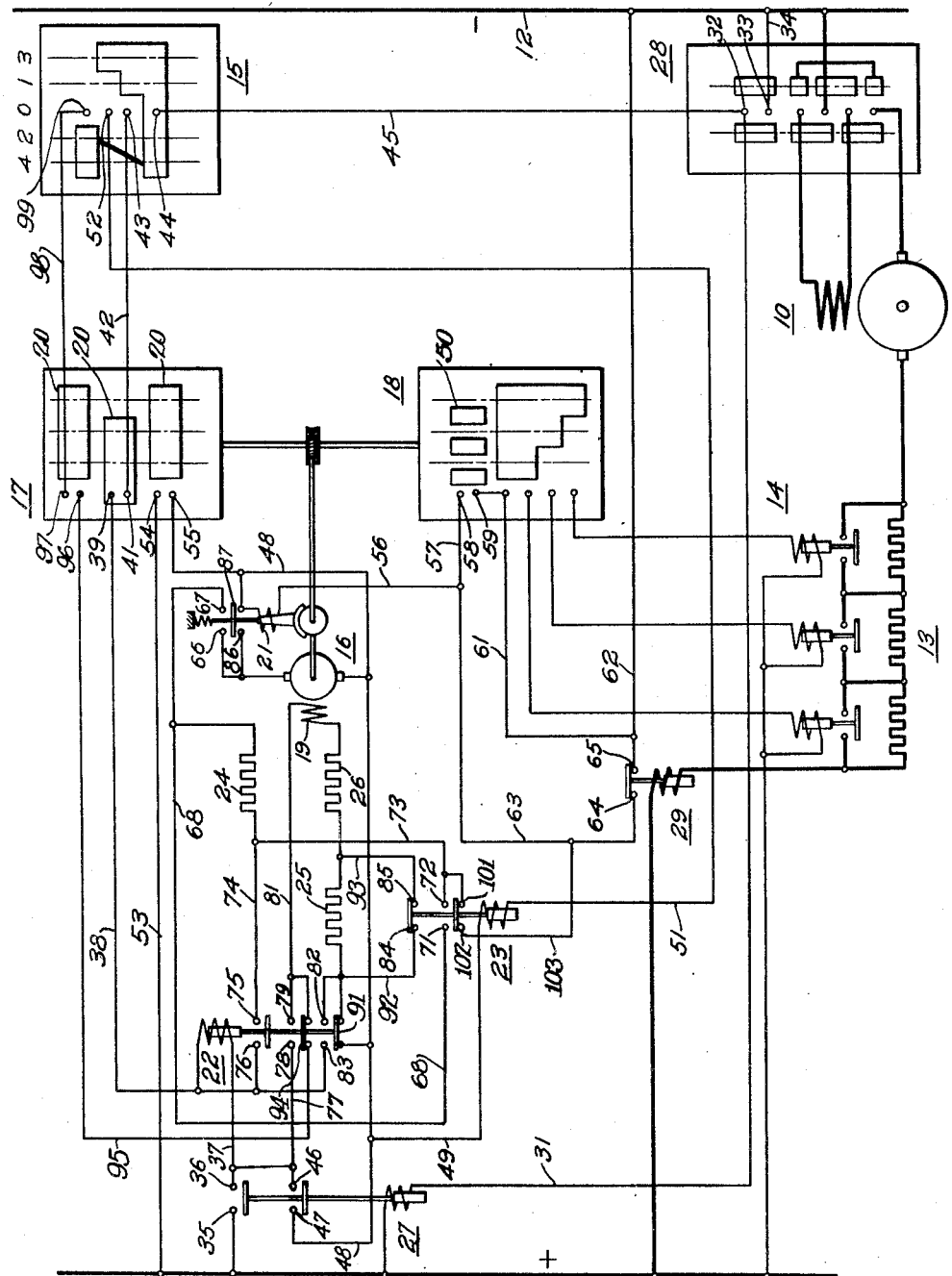
WITNESSES:
INVENTORS
Karl Maertens, Theodor Kopczynski,
Walter Reichel & Peter Weber.
ATTORNEY Patented June 12, 1934

1,962,316

UNITED STATES PATENT OFFICE

1,962,316

MOTOR CONTROL SYSTEM

Karl Maertens, Berlin-Charlottenburg, Theodor Kopczynski, Finkenkrug, near Spandau, Walter Reichel, Berlin-Lankwitz, and Peter Weber, Berlin-Charlottenburg, Germany, assignors to Westinghouse Electric & Manufacturing Company, a corporation of Pennsylvania Application February 5, 1932, Serial No. 591,242
In Germany February 11, 1931

5 Claims. (Cl. 172—179)

This invention relates, generally, to automatic control systems for starting and controlling the speed of electric motors and more particularly to control systems in which the control equipment is operated by a pilot motor to control the acceleration of the propelling motors of electric vehicles.

An object of the invention, generally stated, is to provide a control system which shall be simple, efficient and reliable in operation and which may be economically installed and maintained.

A more specific object of the invention is to provide for varying the rate of acceleration of the propelling motors of an electric vehicle by varying the speed of the pilot motor which operates the control equipment.

Other objects of the invention will be either explained fully hereinafter or will be apparent to those skilled in the art.

According to the invention, the speed of the pilot motor, which operates the control equipment, may be changed either arbitrarily or automatically as a function of the operating position of the master controller, thereby making it possible to perform the starting and accelerating operations in accordance with the load characteristics of the traction motors. For instance, the possibility of adjusting the operating speed of the pilot motor enables the operator of the vehicle to control the operation of the control equipment in such a manner that the slope of a grade and the load on the vehicle may be properly taken into account, and that the maximum motor current, established as a function of the motor speed, will never be exceeded.

The rate of acceleration of the propelling motors of the electric vehicle may be varied by adjusting the speed of the pilot motor which operates the control mechanism. It may also be obtained by changing the gear ratio between the pilot motor and the control mechanism.

For a fuller understanding of the nature and scope of the invention, reference may be had to the following detailed description, taken in conjunction with the accompanying drawing, in which the single figure is a diagrammatic view showing the apparatus and the circuits of a motor control system embodying the invention.

Referring to the drawing, 10 designates a motor which may be of the series type suitable for propelling an electric vehicle or locomotive. As shown, the motor 10 is connected between a positive conductor 11 and a negative conductor 12, and a plurality of accelerating resistors 13 are connected in series with the motor in order to control the speed at which it operates. As is the usual practice, accelerating switches 14 are provided for shunting the resistors 13 in sequential relation in order to accelerate the motor 10.

The acceleration of the motor 10 is regulated by automatic accelerating equipment comprising a master controller 15 by means of which the operation of the accelerating equipment is controlled. The master controller 15 has five notches of which the normal service position is marked "0". In this position a pilot motor 16, which drives the accelerating equipment, is disconnected and the traction motor 10 operates at a constant applied voltage. On notch "1" of the master controller the pilot motor 16 is energized and the accelerating equipment is advanced at the normal rate so that the traction motor 10 has a normal acceleration. On notch "2" of the controller the pilot motor is so energized that the switching mechanism is rotated backward so that the traction motor is decelerated. On notch "4" of the master controller all switches are opened and the pilot motor rotates the switching mechanism back to the "off" position automatically. On notch "3" of the master controller the pilot motor is rotated forward at an increased speed which increases the rate of acceleration of the propelling motor 10, as will be explained in more detail hereinafter.

The control apparatus further comprises an auxiliary control drum 17, which is driven by the pilot motor 16, and a sequence drum 18, also driven by the pilot motor 16. The drum 17 is provided with three contact segments 20 which function as limit switches to deenergize the motor 16 when the drums 17 and 18 have reached the end of their travel in either the forward or the reverse direction, thereby preventing injury to the apparatus. As shown, the sequence drum 18 controls the operation of the accelerating switches 14. The motor 16 is provided with a separately excited shunt field winding 19. A magnet brake 21 is provided for stopping the pilot motor quickly when the armature is deenergized. Provision is also made for utilizing dynamic braking to stop the motor 16. A reversing relay 22, which is controlled by the master controller 15, serves to reverse the pilot motor in order to rotate the drums 17 and 18 either forward or backward. An auxiliary relay 23 serves to short circuit a resistor 24, in the armature circuit of the pilot motor 16, when the master controller is actuated to position "3" thereby increasing the speed of the pilot motor 16. A resistor 25 is also provided in the circuit of the shunt field 19 which is short circuited by the relay 23 when the master controller is in position "1" in order to reduce the speed of the pilot motor. When the master controller is in position "3" and the relay 23 is energized, the resistor 25 reduces the motor field current, thereby increasing the motor speed. An auxiliary contactor 27, the actuating coil of which is energized through contact members on a reversing drum 28, is provided for controlling the energizing circuit to the entire control mechanism. The reversing drum 28 is provided for controlling the direction of motion of the vehicle propelled by the motor 10. As shown the actuating coil of a limit relay 29, which may be of a type commonly used in automatic control systems, is connected in the circuit of the propelling motor 10. The contact members 64 and 65 of the limit relay 29 open the circuit of the brake magnet coil 21 whenever the current in the main motor circuit exceeds a predetermined limit, thereby stopping the sequence drum 18 and preventing a further increase in the motor current. In order that the functioning of the control equipment may be better understood, the operation of the control system when the master controller is set in the maximum acceleration position will now be described.

After actuating the reverser drum 28 to the desired direction of motion for the vehicle, the master controller 15 is actuated to position "3". When the reverser drum 28 is set in either the forward or the reverse position, the actuating coil of the auxiliary contactor 27 is energized and the contactor 27 is closed. The energizing circuit extends from the positive conductor 11, through the coil of the contactor 27, conductor 31, the contact members 32 and 33 on the reverser 28, and conductor 34 to the negative conductor 12.

The reversing relay 22 is then closed, its actuating coil being energized through the following circuit: From the positive conductor 11, through contact members 35 and 36 on the contactor 27, conductor 37, the coil of the relay 22, conductor 38, contact members 39 and 41 on the auxiliary control drum 17, conductor 42, contact members 43 and 44 on the master controller 15, conductor 45, contact members 32 and 33 on the reverser 28 and conductor 34 to the negative conductor 12.

In order to short circuit the resistor 24 in the armature circuit of the pilot motor 16, the auxiliary relay 23 is closed. Its actuating coil is energized through a circuit which extends from the positive conductor 11, through contacts 35, 36, 46 and 47 on the contactor 27, conductors 48 and 49, the actuating coil of the relay 23, conductor 51, contact members 52 and 44 on the controller 15, conductor 45, contacts 32 and 33 on the reverser 28, and conductor 34 to the negative conductor 12.

The brake magnet coil 21 is energized at this time to release the brake and also the armature of the pilot motor 16, thereby rotating the drums 17 and 18 to accelerate the motor 10. The circuit through the brake magnet coil extends from the positive conductor 11, through conductor 53, contact members 54 and 55 of the drum 17 to conductor 48, or from the positive conductor 11 through contact members 35, 36, 46 and 47 on the contactor 27 to conductor 48, thence through the coil of the magnet brake 21, conductors 56 and 57, interlock contacts 58 and 59 of the sequence drum 18, which are intended to give accurate notching, and conductors 61 and 62 to the negative conductor 12, or from conductor 57 through conductor 63, contact members 64 and 65 of the limit relay 29 and conductor 62 to the negative conductor 12.

As previously explained, the limit relay 29 interrupts the operation of the sequence drum 18 when the motor current exceeds a predetermined value. However, contact segments 50 are disposed to bridge the contact fingers 58 and 59, which are in parallel-circuit relation with the contact members 64 and 65 of the limit relay, while the sequence drum is moving from one notch to the next, thereby preventing the drum from stopping between notches.

The motor armature circuit extends from the previously energized conductor 48 through the armature of the motor 16, interlocks 66 and 67 on the brake 21, conductor 68, contact members 71 and 72 of the closed relay 23, conductors 73 and 74, contact members 75 and 76 of the reversing relay 22, conductor 38, contact members 39 and 41 of the control drum 17, conductor 42, contact members 43 and 44 of the master controller 15, conductor 45, contact members 32 and 33 of the reverser 28 and conductor 34 to the negative conductor 12.

It is, therefore, seen that when the master controller 15 is in position "3", the pilot motor is connected to the full control voltage, thereby operating the drum 18 at high speed which causes the motor 10 to accelerate rapidly by closing the accelerating switches 14 in quick succession.

When the master controller 15 is returned to position "1", the relay 23 is opened and the resistor 24 is connected in the armature circuit of the motor 16, thereby reducing the speed of the pilot motor.

As previously mentioned, when the speed of the pilot motor 16 is to be increased, its field strength is changed, in addition to changing the applied armature voltage. At high speed, two resistors 25 and 26 are connected in the pilot motor field circuit while for lower speeds the resistor 25 is short circuited. When the master controller is on position "3" the following is the circuit for the separate field of the motor 16: From the positive conductor 11 through contact members 35 and 36 of the contactor 27, conductors 37 and 77, contact members 78 and 79 of the reversing relay 22, conductor 81, the field winding 19, resistors 26 and 25, contact members 82 and 83 of the reversing relay 22, conductor 38, contact members 39 and 41 of the control drum 17, conductor 42, contact members 43 and 44 of the master controller 15, conductor 45, contact members 32 and 33 of the reverser 28 and conductor 34 to the negative conductor 12. When the master controller 15 is on all other positions the relay 23 is in its lowermost position and the resistor 25 is short-circuited by the contact members 84 and 85.

As previously mentioned, when the motor 16 is deenergized it is stopped by the magnet brake 21 and also by dynamic braking which is established through contact members 86 and 87 on the brake magnet 21.

When the controller 15 is in position "2" or "4", the pilot motor 16 is operated in the reverse direction and the sequence drum 18 is rotated backward to decelerate the motor 10. The actuating coil of the relay 22 is deenergized, thereby permitting this relay to drop to its lowermost position to reverse the field current in the motor 16. The circuit through the field winding may now be traced from the previously energized conductor 48, through contact member 91 on the relay 22, conductor 92, contact members 84 and 85 on the relay 23, conductor 93, resistor 26, field winding 19, conductor 81, contact member 94, conductor 95, contact fingers 96 and 97 on the drum 17, conductor 98, contact fingers 99 and 44 on the controller 15, conductor 45, contact fingers 32 and 33 on the drum 28 and conductor 34 to the negative conductor 12.

The current through the armature of the motor 16 is not reversed at this time, the circuit extending from conductor 48, through the armature of the motor 16, contact members 66 and 67, conductor 68, resistor 24, conductor 73, contact members 101 and 102 on the relay 23, conductors 103 and 63, contact members 64 and 65 on the relay 29 and conductor 62 to the negative conductor 12. The motor 16 will, therefore, run in the reverse direction to rotate the drums 17 and 18 toward the off position.

In the embodiment of the invention shown and described, the operating speed of the pilot motor is automatically changed as a function of the operating position of the master controller. However, in some instances it may be desirable to permit the operator of the vehicle to arbitrarily adjust the base speed of the pilot motor in accordance with the masses to be accelerated. This can be readily accomplished for instance, by varying automatically, and as a function of the controller position, the resistance connected in series with the armature circuit of the pilot motor operating the control apparatus whereas the mass to be accelerated can be taken into account by properly adjusting the field current of said pilot motor.

Since many modifications may be made in the apparatus and arrangement of parts without departing from the spirit of our invention, we do not wish to be limited other than by the scope of the appended claims.

We claim as our invention:

1. In a motor control system, in combination, a propelling motor, automatic accelerating equipment for controlling the motor, a pilot motor for operating the accelerating equipment, a controller for controlling the operation of the accelerating equipment, means associated with the controller for varying the operating speed of the pilot motor in accordance with the position of the controller, thereby varying the rate of acceleration of the propelling motor, and means for controlling the operation of the pilot motor to limit the current in the propelling motor to a predetermined value.

2. In a motor control system, in combination, a propelling motor, automatic accelerating equipment for controlling the motor, a pilot motor for operating the accelerating equipment, a controller for controlling the operation of the accelerating equipment, means associated with the controller for varying the armature voltage of the pilot motor in accordance with the position of the controller, means for arbitrarily adjusting the field current of the pilot motor, whereby the rate of acceleration of the propelling motor may be varied, and means for controlling the operation of the pilot motor to limit the current in the propelling motor to a predetermined value.

3. In a motor control system, in combination, a propelling motor, automatic accelerating equipment for controlling the motor, a pilot motor for operating the accelerating equipment, manually controlled means for varying the speed at which the pilot motor operates the accelerating equipment to vary the rate of acceleration of the propelling motor, and current responsive means for controlling the operation of the pilot motor to limit the current in the propelling motor to a predetermined value.

4. In a motor control system, in combination, a propelling motor, accelerating equipment for varying the motor current to control the speed of the motor, a pilot motor for operating the accelerating equipment, a manually operable controller for controlling the operation of the accelerating equipment, means associated with the controller for regulating the operating speed of the pilot motor in accordance with the position of the controller to vary the rate of acceleration of the propelling motor, and a relay responsive to the current in the propelling motor for controlling the operation of the pilot motor to limit the current in the propelling motor to a predetermined value.

5. In a motor control system, in combination, a propelling motor, accelerating equipment for varying the motor current to control the speed of the motor, a pilot motor for operating the accelerating equipment, a manually operable controller for controlling the direction of rotation of the pilot motor, means associated with the controller for regulating the operating speed of the pilot motor in accordance with the position of the controller to vary the rate of acceleration of the propelling motor, and a limit relay for controlling the operation of the pilot motor to limit the current in the propelling motor to a predetermined value.

KARL MAERTENS.
THEODOR KOPCZYNSKI.
WALTER REICHEL.
PETER WEBER.